United States Patent
Walters et al.

(10) Patent No.: US 10,812,279 B1
(45) Date of Patent: Oct. 20, 2020

(54) AUTOMATED COMMUNICATION INITIATION BASED ON AN ENVIRONMENT-RELATED USER AVAILABILITY DETERMINATION

(71) Applicant: Capital One Services, LLC, McLean, VA (US)

(72) Inventors: Austin Walters, McLean, VA (US); Vincent Pham, McLean, VA (US); Jeremy Goodsitt, McLean, VA (US); Galen Rafferty, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/726,476

(22) Filed: Dec. 24, 2019

(51) Int. Cl.
   *H04L 12/18* (2006.01)
   *H04L 29/08* (2006.01)
   *H04L 29/06* (2006.01)

(52) U.S. Cl.
   CPC ........ *H04L 12/1818* (2013.01); *H04L 65/403* (2013.01); *H04L 67/22* (2013.01); *H04L 67/24* (2013.01); *H04L 67/306* (2013.01); *H04L 67/325* (2013.01); *H04L 65/1069* (2013.01)

(58) Field of Classification Search
   CPC . H04L 12/1818; H04L 65/1069; H04L 67/22; H04L 67/24; H04M 2250/12; H04M 3/42365
   See application file for complete search history.

(56) References Cited

U.S. PATENT DOCUMENTS

| | | | |
|---|---|---|---|
| 6,947,539 B2 | 9/2005 | Graham et al. | |
| 6,999,572 B1 | 2/2006 | Shaffer et al. | |
| 7,343,008 B1* | 3/2008 | Frankel | H04M 3/56 370/260 |
| 7,353,251 B1 | 4/2008 | Balakrishnan | |
| 8,374,590 B1* | 2/2013 | Mikan | H04H 60/46 455/414.3 |
| 2009/0165022 A1* | 6/2009 | Madsen | G06Q 10/109 719/318 |
| 2010/0093315 A1 | 4/2010 | Grosch et al. | |
| 2010/0239082 A1 | 9/2010 | Ryskamp | |
| 2014/0029744 A1 | 1/2014 | Ryskamp | |
| 2015/0260580 A1* | 9/2015 | Alameh | G06F 1/3265 250/339.02 |

(Continued)

*Primary Examiner* — Jeong S Park
(74) *Attorney, Agent, or Firm* — Pillsbury Winthrop Shaw Pittman LLP (57) ABSTRACT

In certain embodiments, an availability state of a user for joining a meeting is determined based on a physical environment of the user, and a call is initiated to the user based on the availability state indicating that the user is available for the meeting. Audio/visual data obtained from a client device associated with the user may be used to determine interaction data indicating an extent of interaction of the user with another individual. Interaction data indicating that the user is not interacting with the other individual either in person or on phone may be used to determine the availability state as being available for joining the meeting. Sensor data obtained from the client device, such as a rate of motion of the user, may also be used to determine the availability state. Meeting priority information may also be used to determine the availability state for joining the meeting.

20 Claims, 6 Drawing Sheets

(56) References Cited

U.S. PATENT DOCUMENTS

| | | | |
|---|---|---|---|
| 2015/0302869 A1* | 10/2015 | Tomlin | G10L 25/48 |
| | | | 704/246 |
| 2017/0359463 A1 | 12/2017 | Segalis et al. | |
| 2019/0086223 A1* | 3/2019 | Tanaka | G08G 1/096866 |
| 2020/0005246 A1* | 1/2020 | Chrabaszcz | H04L 67/306 |
| 2020/0034610 A1* | 1/2020 | Taylor | G06Q 20/327 |

* cited by examiner

AUTOMATED COMMUNICATION INITIATION BASED ON AN ENVIRONMENT-RELATED USER AVAILABILITY DETERMINATION

FIELD OF THE INVENTION

The invention relates to automated communication initiation, including, for example, automatically initiating communication with a user based on an environment-related user availability determination.

BACKGROUND OF THE INVENTION

Some conference systems can make joining a meeting/conference call as simple as picking up the phone. Instead of having the participants of a meeting remember to dial in, the conference system dials everyone into the conference automatically. All participants will automatically receive a call at the scheduled time, and they will be joined to the meeting upon picking the call. However, even if a participant is scheduled to join a meeting, the participant may not actually be immediately available at the scheduled time. As an example, if the participant is interacting with another individual either in person or on a telephone at a time proximate the meeting time, the participant may be busy/not available to join the meeting, and the call may disturb the participant. Thus, in such cases, time, energy, and other resources (whether machine or human resources) are needlessly utilized on the computer systems. These and other drawbacks exist.

SUMMARY OF THE INVENTION

Aspects of the invention relate to methods, apparatuses, and/or systems for facilitating determining an availability of a user for a call associated with a meeting and automatically initiating the call to the user.

In some embodiments, a conference system determines an availability state of a user for joining a meeting based on a physical environment of the user, and automatically initiates a call to the user if the availability state indicates that the user is available for the meeting. As an example, the conference system obtains audio/visual data from a client device associated with the user to determine interaction data indicating an extent of interaction of the user with one or more other individuals either in person or on a call. The conference system can determine the availability state based on the interaction data. As another example, the conference system can obtain sensor data (e.g., a rate of motion of the user or other sensor data) from the client device, and can determine the availability state based on such sensor data. If the availability state indicates that the user is available for the meeting, the conference system can initiate a call to the user. On the other hand, if the availability state indicates that the user is not available for the meeting, the conference may not initiate the call to the user, and can, optionally, generate a notification at the client device reminding the user to join the meeting.

In some embodiments, if the user has conflicting meetings (e.g., a second meeting that overlaps with a meeting time of a first meeting), the conference system can determine which of the two meetings is of a greater priority to the user, determine the availability of the user as being available for that meeting and unavailable for the other meeting, and initiate a call to the user to join the meeting with the greater priority. The conference system can determine a priority of a meeting from meeting data associated with the meeting, such as a list of participants in a meeting invite of the meeting, participant information (e.g., a title, designation, hierarchical placement of participants in relation to the user, or other information), a subject of the meeting, body of the meeting invite, or a user-provided priority indicator in the meeting invite. A priority of the meeting can be determined in various ways (e.g., based on rules set by the user, based on a prediction model, etc.).

The availability state can be determined based on the interaction data in various ways, for example, based on specified criteria/rules/policies set by the user or based on a prediction model. In some embodiments, training information may be provided as input to a prediction model to generate predictions related to determining the availability state of the user based on the interaction data. As an example, the training information may indicate (a) interaction data, sensor data, or meeting data, (b) availability state determined based on the interaction data, sensor data, or meeting data, (c) whether an automatic call was initiated and, if yes, whether the call was accepted by the user, or such other information with respect to a number of calls. In some embodiments, call acceptance/rejection information of a specified call and the interaction data, sensor data, or meeting data based on which the availability state is determined may be provided as reference feedback to the prediction model. As an example, the call acceptance/rejection information indicating that the user rejected a call and the interaction data, which indicated that the user, while not interacting with another individual, was viewing a video may be provided as reference feedback to the prediction model. The prediction model may update one or more portions of the prediction model based on the predictions and the reference feedback information. Subsequent to the updating of the prediction model, the prediction model may be used to process the interaction data to determine the availability state of the user and initiate a call to the user based on the availability state for joining the meeting.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

DETAILED DESCRIPTION OF THE INVENTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
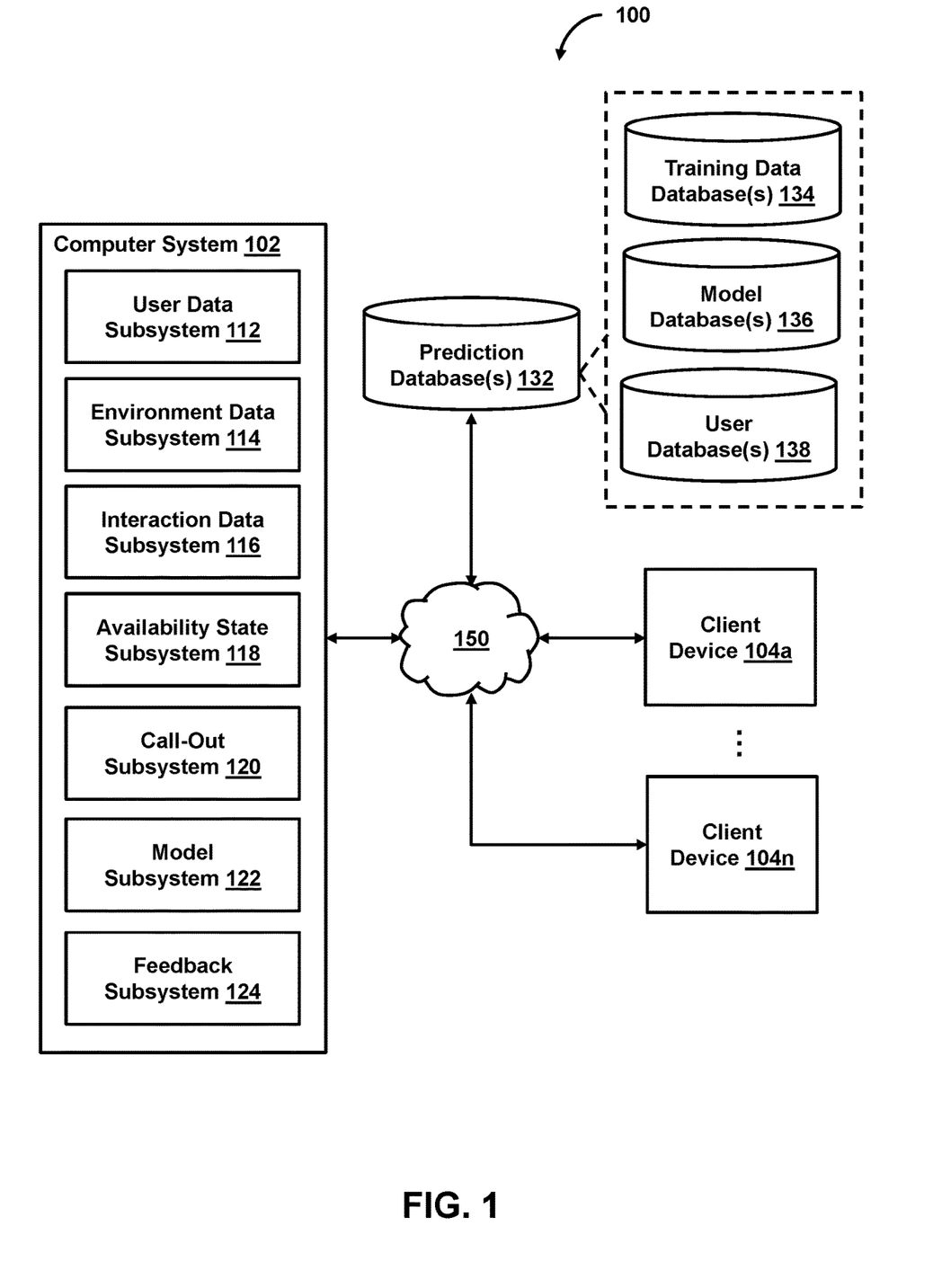
FIG. 1 shows a system for facilitating automatic communication initiation to a user based on an availability state of the user, in accordance with one or more embodiments.

FIG. 1 shows a conference system 100 for facilitating automated communication initiation, in accordance with one or more embodiments. As shown in FIG. 1, system 100 may include computer system 102, client device 104 (or client devices 104a-104n), or other components. Computer system 102 may include user data subsystem 112, environment data subsystem 114, interaction data subsystem 116, availability state subsystem 118, call-out subsystem 120, model subsystem 122, feedback subsystem 124, or other components. Each client device 104 may include any type of mobile terminal, fixed terminal, or other device. By way of example, client device 104 may include a desktop computer, a notebook computer, a tablet computer, a smartphone, a wearable device, or other client device. Users may, for instance, utilize one or more client devices 104 to interact with one another, one or more servers, or other components of system 100. It should be noted that, while one or more operations are described herein as being performed by particular components of computer system 102, those operations may, in some embodiments, be performed by other components of computer system 102 or other components of system 100. As an example, while one or more operations are described herein as being performed by components of computer system 102, those operations may, in some embodiments, be performed by components of client device 104. It should be noted that, although some embodiments are described herein with respect to machine learning models, other prediction models (e.g., statistical models or other analytics models) may be used in lieu of or in addition to machine learning models in other embodiments (e.g., a statistical model replacing a machine learning model and a non-statistical model replacing a non-machine-learning model in one or more embodiments).

In some embodiments, system 100 determines an availability state of a user based on a physical environment of the user, and automatically initiates a call to the user if the availability state indicates that the user is available (e.g., to pick up the call, to join a meeting, etc.). As an example, environment data related to the physical environment of the user may include audio/visual data related to the physical environment of the user, and the call may include a telephonic call, a video call, or other call (e.g., an online or interactive session). In some embodiments, system 100 can obtain the audio/visual data from client device 104, for example, from a microphone and camera associated with client device 104. System 100 can determine, based on the audio/visual data, interaction data indicating an extent to which the user is interacting with one or more entities (e.g., interacting with one or more individuals or other entities via one or more phones or other devices). As an example, interaction data may indicate (a) a physical presence or absence of one or more individuals with the user (e.g., in the same room as the user), (b) a presence or absence of voice of the user (e.g., user talking on a phone), (c) a presence or absence of voice of one or more other individuals in the physical environment of the user (e.g., user talking to other individuals), (d) background noise in the physical environment of the user, (e) the user interacting with content (e.g., listening to music, watching a video, etc.), or (f) other user interactions.

System 100 may determine an availability state of a user based on interaction data (e.g., derived from environment data or other data). As an example, system 100 may determine the availability state of the user as being available for a meeting based on the interaction data indicating that one or more individuals are (a) not physically present with the user or (b) not interacting with the user otherwise. Continuing with the example, system 100 may determine the availability state of the user as not being available for the meeting based on the interaction data indicating that the user is (a) physically present with one or more individuals, or (b) interacting with the one or more individuals otherwise.

In some embodiments, system 100 may determine the availability state based on other types of environment data, such as sensor data associated with client device 104 indicating one or more physical environment data related to the user. As an example, system 100 may obtain sensor data, such as a geographical location of the user or a rate of motion of the user (e.g., speed, acceleration, etc.), from the client device 104, and may determine the availability state based on the sensor data. For example, system 100 may determine the availability state of the user as not being available for the meeting based on the sensor data indicating that a rate of motion of the user exceeds a threshold (e.g., speed or acceleration data may indicate that the user is jogging, driving, etc.). In another example, system 100 may determine the availability state of the user as not being available for the meeting based on the sensor data indicating that the user is in a location that is not among one or more specified locations.

After a user's availability state is determined, system 100 may initiate a call to the user based on the availability state indicating that the user is available for the meeting. On the other hand, if the availability state indicates that the user is not available for the meeting, system 100 may not initiate the call to the user, and can, optionally, generate a notification, at client device 104, reminding the user to join the meeting. In some embodiments, system 100 may join the user to the meeting in response to the user selecting the notification.

System 100 may also determine the availability state based on calendar data associated with the user. For example, if the calendar data indicates that the user has a first meeting, then system 100 may determine the availability state as the user not being available for a second meeting with a meeting time overlapping with that of the first meeting. However, in another example, system 100 may determine the availability state as the user being available for the second meeting based on priority data of the meetings indicating that the second meeting is having a greater priority than the first meeting. In such a case, system 100 may initiate a call to the user to join the second meeting. Alternatively, system 100 may generate a notification recommending the user to join the second meeting and join the user to the second meeting in response to the user accepting the recommendation.

In some embodiments, system 100 may train a prediction model to determine the availability state of the user based on the interaction data or other environment data. In some embodiments, system 100 may obtain interaction data or other environment data and provide such information as input to a prediction model to generate predictions (e.g., related to determining the availability state as being available or not). As an example, the interaction data may indicate whether the user was present with or in conversation with another individual. As another example, environment data such as sensor data may indicate a rate of motion of the user. In some embodiments, system 100 may provide call acceptance/rejection information associated with a specified meeting as reference feedback to the prediction model, and the prediction model may update one or more portions of the prediction model based on the predictions and the call acceptance/rejection information. As an example, the call acceptance/rejection information may indicate whether the user accepted or rejected the call when the availability state was determined as the user being available based on a specified interaction data, sensor data or meeting data. As another example, the call acceptance/rejection information may also indicate whether the user manually called to join the meeting when the availability state indicated that the user was not available for the meeting based on a specified interaction data, sensor data or meeting data. In this way, for example, the prediction model may be trained or configured to generate more accurate predictions.

As such, in some embodiments, subsequent to the updating of the prediction model, system 100 may use the prediction model to determine the availability state of the user and initiate a call to the user based on the availability state. As an example, system 100 may obtain and provide information related to the interaction data or other environment data to the prediction model to obtain one or more predictions from the prediction model. System 100 may use the predictions to determine the availability state of the user (e.g., whether the user is available or not for joining the meeting) and initiating a call to the user based on the availability state.

In some embodiments, the prediction model may include one or more neural networks or other machine learning models. As an example, neural networks may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections can be enforcing or inhibitory in their effect on the activation state of connected neural units. In some embodiments, each individual neural unit may have a summation function which combines the values of all its inputs together. In some embodiments, each connection (or the neural unit itself) may have a threshold function such that the signal must surpass the threshold before it propagates to other neural units. These neural network systems may be self-learning and trained, rather than explicitly programmed, and can perform significantly better in certain areas of problem solving, as compared to traditional computer programs. In some embodiments, neural networks may include multiple layers (e.g., where a signal path traverses from front layers to back layers). In some embodiments, back propagation techniques may be utilized by the neural networks, where forward stimulation is used to reset weights on the "front" neural units. In some embodiments, stimulation and inhibition for neural networks may be more free-flowing, with connections interacting in a more chaotic and complex fashion.

Figure 2:
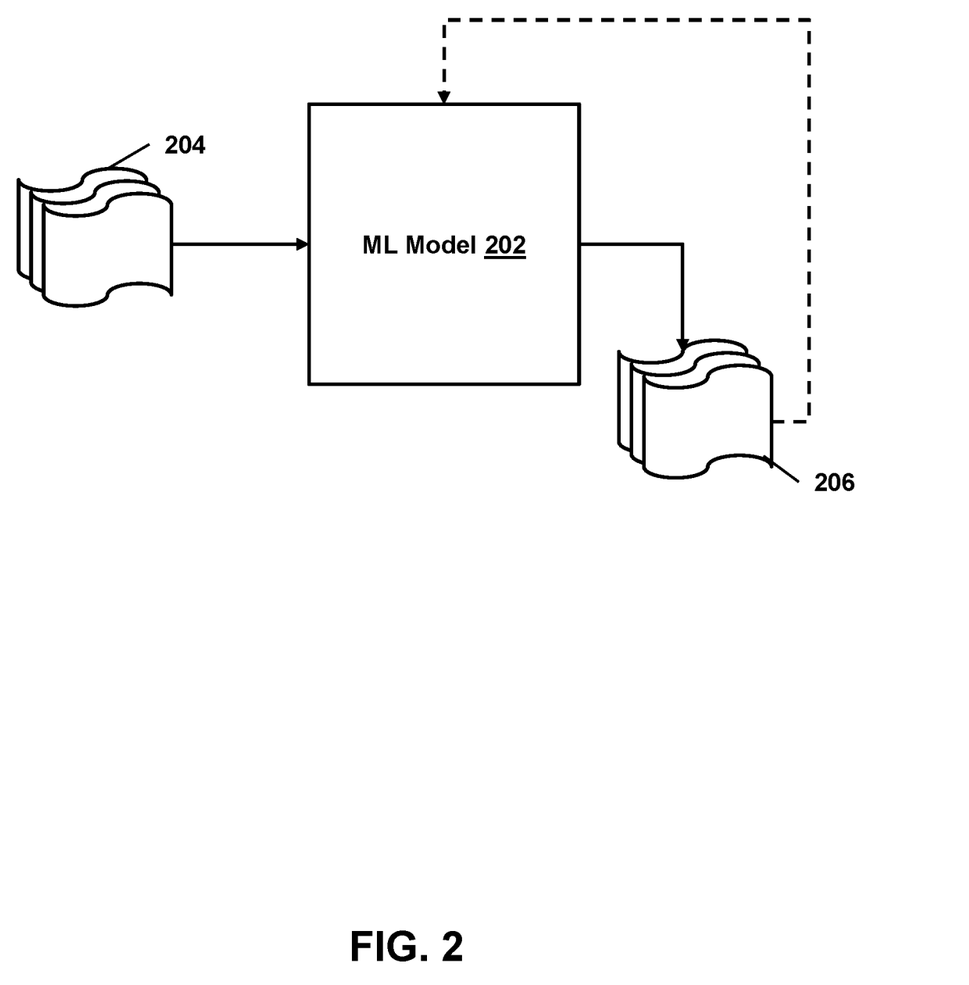
FIG. 2 shows a machine learning model configured to facilitate automatic communication initiation to a user based on an availability state of the user, in accordance with one or more embodiments.

As an example, with respect to FIG. 2, machine learning model 202 may take inputs 204 and provide outputs 206. In one use case, outputs 206 may be fed back to machine learning model 202 as input to train machine learning model 202 (e.g., alone or in conjunction with user indications of the accuracy of outputs 206, labels associated with the inputs, or with other reference feedback information). In another use case, machine learning model 202 may update its configurations (e.g., weights, biases, or other parameters) based on its assessment of its prediction (e.g., outputs 206) and reference feedback information (e.g., user indication of accuracy, reference labels, or other information). In another use case, where machine learning model 202 is a neural network, connection weights may be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine learning model 202 may be trained to generate better predictions.

Subsystems 112-124

In some embodiments, user data subsystem 112 facilitates management (e.g., adding, removing, or editing) of user profile data. The user profile data may include user related data such as a username, user contact information (e.g., telephone number, email ID), calendar data, or user preferences (e.g., whether user opts in for getting automated calls for joining meetings, locations where the user is available or unavailable to take calls for the meetings, or whether the user prefers to receive automated calls for the meeting even when the availability state is determined as not available for a meeting). In some embodiments, the user profile data can also include user information, such as a title, designation, hierarchical placement of the user in an organization relative to other users, or other information. User data subsystem 112 may provide a graphical user interface (GUI) to the user for managing the user profile. In some embodiments, user data subsystem 112 stores the user profile data in user database 138.

In some embodiments, environment data subsystem 114 obtains environment data related to a physical environment of the user. Environment data may include audio/visual data related to the physical environment of the user or other data such as a location of the user, a rate of motion of the user. In one scenario, with respect to FIG. 3, computer system 102 may utilize one or more components of client device 306 to obtain environment data related to a physical environment of user 302. As an example, computer system 102 may request microphone 308 and camera 310 of client device 306 for the audio/visual data related to the physical environment of user 302. In response, client device 306 may have microphone 308 "listen" to and camera 310 "view" the physical environment of user 302 to capture the audio/visual data and transmit the captured audio/visual data to computer system 102. In some embodiments, computer system 102 receives the audio/visual data from client device 306 in real-time. The audio/visual data may include audio data of the physical environment of user 302, such as a voice of user 302, a voice of one or more other individuals, background noise in the physical environment of user 302 or any other sound that may be captured by microphone 308. Similarly, the audio/visual data may include video data of the physical environment of user 302 having a video image of user 302, one or more other individuals, background of the user 302 or any other aspects that may be captured by camera 310.

Figure 3:
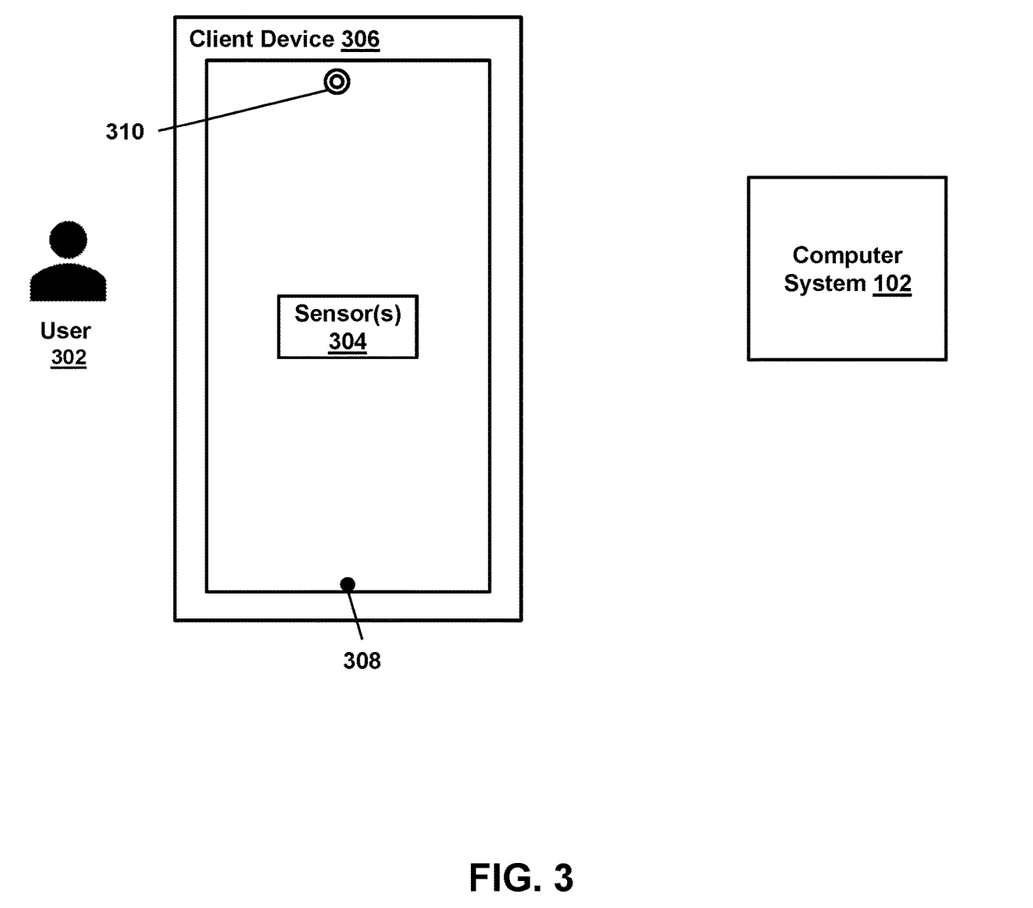
FIG. 3 shows a computer system performing automatic communication initiation to the user based on an availability state of the user, in accordance with one or more embodiments.

While the foregoing paragraph describes environment data subsystem 114 as obtaining audio/visual data, environment data subsystem 114 may also obtain one of the audio/visual feed. As an example, computer system 102 may obtain the video data from camera 310 but not the audio data from microphone 308. As another example, computer system 102 may obtain the audio data from microphone 308 but not the video data (e.g., in cases where the client devices do not have a camera).

In some embodiments, computer system 102 may request other environment data such as sensor data from sensor 304 of client device 306. As an example, sensor 304 may include a global positioning system (GPS) device that provides a location of the user 302 as sensor data. As another example, sensor 304 may include an accelerometer that provides a rate of motion of user 302.

Interaction data subsystem 116 may derive or determine interaction data indicating an extent of interaction/engagement of user 302 with one or more entities from the environment data. In some embodiments, interaction data subsystem 116 may determine interaction data indicating whether user 302 is interacting with one or more individuals based on the audio/visual data obtained by the environment data subsystem 114. For example, interaction data subsystem 116 may determine that user 302 is interacting or conversing with another individual based on the audio/visual data indicating a presence of the voice(s) of user 302 and another individual. In another example, interaction data subsystem 116 may determine interaction data indicating that user 302 is interacting with another individual based on the audio/visual data indicating a presence of voice of user 302 (e.g., user 302 is in a conversation with another individual on a call). In another example, interaction data subsystem 116 may determine interaction data indicating that user 302 is watching a video/movie based on the audio/visual data indicating any presence of voice of multiple individuals, music, loud sounds, background music, etc. In another example, interaction data subsystem 116 may determine interaction data indicating that user 302 is interacting with another individual based on the audio/visual indicating a physical presence of one or more individuals with user 302 (e.g., in the same room as user 302).

Interaction data subsystem 116 may use any of various techniques in determining the interaction data. For example, interaction data subsystem 116 may use natural language processing (NLP) techniques on audio/visual data to determine if user 302 is conversing with one or more other individuals. In some embodiments, NLP techniques may also aid interaction data subsystem 116 in determining what is the conversation user 302 is having about, identifying the one or more individuals in the conversation, etc. In another example, interaction data subsystem 116 may use image recognition techniques on audio/visual data to determine if one or more other individuals are physically present with user 302. In some embodiments, image recognition techniques may also aid interaction data subsystem 116 in identifying the one or more individuals present with user 302.

Availability state subsystem 118 may determine an availability state of user 302 for a meeting based on the interaction data determined by interaction data subsystem 116. In some embodiments, availability state subsystem 118 determines the availability state of user 302 as being "available" for the meeting for some types of interaction and as being "unavailable" for other types of interaction. For example, availability state subsystem 118 may determine the availability state of user 302 as being unavailable based on the interaction data indicating that user 302 is interacting with, conversing with or physically present with another individual. In another example, availability state subsystem 118 may determine the availability state of user 302 as being unavailable based on the interaction data indicating that user 302 is watching a video/movie. In another example, availability state subsystem 118 may determine the availability state of user 302 as being available for the meeting based on the interaction data indicating that user 302 is not interacting with, conversing with or physically present with another individual. In another example, availability state subsystem 118 may determine the availability state of user 302 as being available for the meeting based on the interaction data indicating that user 302 is interacting with, conversing with or physically present with another individual but the other individual is also an invitee for the meeting. In another example, availability state subsystem 118 may determine the availability state of user 302 as being available for the meeting based on the interaction data indicating that user 302 is interacting with, conversing with or physically present with another individual but the duration of interaction did not exceed a first threshold (e.g., 60 seconds or other threshold). In another example, availability state subsystem 118 may determine the availability state of user 302 as being available for the meeting based on the interaction data indicating that user 302 is interacting with, conversing with or physically present with another individual but a loudness of the voice of user 302 or the other individual did not exceed a second threshold.

Availability state subsystem 118 may determine an availability state of user 302 also based on other environment data such as the sensor data obtained by environment data subsystem 114. For example, availability state subsystem 118 may determine the availability state of user 302 as being unavailable for the meeting based on the sensor data indicating that a rate of motion of user 302 exceeds a specified threshold (e.g., 4 miles per hour or other threshold). In one use case, if it is determined that user 302 is jogging, running, driving, sailing, or flying, the user may be determined to be unavailable for the meeting (e.g., unless the user has indicated otherwise via user preferences, unless machine learning training data indicates otherwise, etc.). In another example, availability state subsystem 118 may determine the availability state of user 302 as being unavailable for the meeting based on the sensor data indicating that a location of user 302 is not in a list of locations specified by user 302 as available to join the meeting from. In one scenario, user 302 may indicate (e.g., as part of user profile data using user data subsystem 112) that user 302 is available for joining meetings while at home or office. In such a scenario, when user 302 is at a location other than home or office at the time of meeting, availability state subsystem 118 may determine the availability state of user 302 as being unavailable for joining the meeting.

In some embodiments, availability state subsystem 118 may determine the availability state of user 302 based on a combination of the interaction data and the sensor data. For example, availability state subsystem 118 may determine the availability state of user 302 as being available for the meeting even when the interaction data is indicating that user 302 is an interaction (e.g., watching a video or talking to another individual but the sensor data indicates that user 302 is located at home).

Further, in some embodiments, the availability state subsystem 118 may also determine the availability state of the user 302 based on user history, which includes information regarding past user actions with respect to accepting or rejecting calls. For example, if the user history indicates that user 302 has accepted calls even when user 302 was watching a video/movie, availability state subsystem 118 may determine the availability state of user 302 as being available even though the interaction data indicates that user 302 is involved in an interaction (e.g., watching a video/movie). In another example, although the interaction data may indicate that user 302 is not interacting with, conversing with or physically present with another individual, availability state subsystem 118 may determine the availability state of user 302 as being unavailable for the meeting based on the user history indicating that user 302 does not accept calls while user 302 is at a specified location.

In some embodiments, availability state subsystem 118 may determine the availability state of user 302 based on a priority of meetings. For example, if user 302 is scheduled to attend a first meeting at a first time and a second meeting at a second time that overlaps with the first time, at least in part, availability state subsystem 118 may determine the availability state of user 302 as available for a meeting with a greater priority of the two and as unavailable for the other meeting. Availability state subsystem 118 may determine a priority of the meeting based on meeting data associated with the meeting, such as a list of participants in a meeting invite of a meeting, participant information (e.g., a title, designation, hierarchical placement of participants in relation to the user, or other information), a subject of the meeting, body of the meeting invite, or a user-provided priority indicator in the meeting invite. As an example, availability state subsystem 118 may determine that the first meeting has a greater priority than the second meeting based on meeting data indicating that (a) there are more participants in the meeting invite of the first meeting than the second meeting, (b) participants in the first meeting are of more senior level roles in an organization than the user, or than those in the second meeting (e.g., the user and other participants in the second meeting are of a role "system engineer" whereas one or more participants in the first meeting are of a role "vice president," or the user is of "vice president" role and other participants in the second meeting are "system engineers" whereas one or more participants in the first meeting are of a role "vice president" or "senior vice president"), (c) subject of the first meeting is of a higher priority compared to that of the second meeting, (d) organizer of the first meeting has indicated that the first meeting is of high priority in the meeting invite, (e) first meeting has been rescheduled more number of times than the second meeting, or (f) body/subject of the meeting invite of the first meeting indicating that attendance to the meeting is mandatory. In some embodiments, the availability state subsystem 118 may obtain participant information (e.g., a title, designation, hierarchical placement of participants in relation to the user, or other information) from user data subsystem 112, which can obtain the information from user database 138.

Further, in some embodiments, the availability state subsystem 118 may also determine the priority of a meeting based on user history, which includes information regarding past user actions with respect to accepting or rejecting calls. For example, if the user history indicates that user 302 has accepted calls for a first meeting in which participants are of the same role or designation as user 302 but belong to a specific team in an organization, and ignored the second meeting in which participants are of a higher role or designation than user 302 or other participants in the first meeting, availability state subsystem 118 may determine the first meeting with participants from the specific team has a higher priority over the second meeting. In another example, although the meeting data indicates that the organizer has indicated in the meeting invite that the first meeting is of high priority, availability state subsystem 118 may determine the second meeting is of higher priority based on the user history indicating that user 302 typically does not accept calls from the organizer of the first meeting.

Availability state subsystem 118 may consider the interaction data or sensor data of a specified duration to determine the availability state. As an example, availability state subsystem 118 may consider interaction data indicating an extent of interaction of the user for 2 minutes in the last 5 minutes prior to the start of the meeting in determining the availability state of the user.

Call-out subsystem 120 may initiate a call to user 302 for joining a meeting based on the availability state of user 302 determined by availability state subsystem 118. As an example, call-out subsystem 120 may initiate the call associated with the meeting based on the availability state of user 302 indicating that user 302 is available for the meeting. Upon receiving the call (e.g., at client device 306), user 302 may accept the call to join the meeting. As another example, call-out subsystem 120 may not initiate the call based on the availability state of user 302 indicating that user 302 is unavailable for the meeting, and optionally, call-out subsystem 120 may send a notification to user 302 (e.g., at client device 306), reminding user 302 to join the meeting. In some embodiments, the notification may also include a phone number (e.g., one touch dialing number), which user 302 may dial to join the meeting.

In some embodiments, call-out subsystem 120 may initiate a call on multiple client devices associated with user 302. For example, call-out subsystem 120 may initiate the call on a smartphone, a desk phone, or a laptop associated with user 302, and user 302 may join the meeting by accepting the call on any one of the client devices. In another example, call-out subsystem 120 may initiate the call on a client device specified by user 302 (e.g., as part of user preferences in user profile) based on one or more rules. In one example, a rule may indicate that user 302 would like to receive the call at a desk phone when user 302 is in the office and at his/her mobile number when user 302 is not located in the office.

Referring to the availability state of user 302, availability state subsystem 118 may be implemented in any of various configurations to determine the availability state of user 302. As an example, availability state subsystem 118 may be implemented as a rule-based system where a user (e.g., administrator of computer system 102) may define rules for determining the availability state of a participant for joining a meeting. In some embodiments, the rules may also be defined or customized by a participant (e.g., user 302). The rules may include interaction data, sensor data, or meeting data as criteria for determining the availability state of user 302. For example, one rule may define that the availability state of user 302 is to be determined as unavailable for the meeting when the interaction data indicates or a satisfies a criterion that a user should have a conversation with another individual for at least 60 seconds. In another example, a rule may define that when user 302 has two or more conflicting meetings (e.g., conflicting based on overlapping meeting times), user 302 is to be determined as (a) available for a meeting having greater priority than the other meetings and (b) unavailable for the other meetings. Many such rules may be defined for determining the availability state.

As another example, availability state subsystem 118 may be implemented using artificial intelligence techniques, such as a prediction model, to determine the availability state of the user. In some embodiments, a collection of data points related to information such as (a) interaction data, sensor data, or meeting data, (b) availability state determined based on the interaction data, sensor data, or meeting data, (c) whether an automatic call was initiated and if yes, whether the call was accepted by the user, or such other information with respect to a number of calls (e.g., 50 or more calls, 100 or more calls, 500 or more calls, 1000 or more calls, 10000 or more calls, 100000 or more calls, etc.) may be obtained and provided to the prediction model as training data to configure or train the prediction model. Such information may be stored by computer system 102 in a storage system (e.g., training database 134). In some embodiments, model subsystem 122 may obtain the training data from the training database 134 and provide such information as input to a prediction model to generate predictions. Feedback subsystem 124 may provide result information as reference feedback to the prediction model, and the prediction model may update its configurations (e.g., weights, biases, or other parameters) based on the predictions and the result information. In some embodiments, feedback subsystem 124 may provide the result information as reference feedback to the prediction model to cause the prediction model to assess its predictions against the result information. As an example, the prediction model may update its configurations (e.g., weights, biases, or other parameters) based on its assessment of the predictions. As an example, the predictions generated by the prediction model (e.g., based on the interaction data, sensor data, or meeting data) may include predictions related to determining the availability state of the user as being available or not for joining a meeting, determining a meeting among one or more meetings having a conflicting meeting time that is of a greater priority, determining a specified phone number to call the user at for joining the meeting, or other predictions. The result information may include call acceptance/rejection information indicating (a) whether the user accepted the automatically initiated call or not when the availability state indicated that the user is available for the meeting based on a specified interaction data, sensor data or meeting data, or (b) whether the user manually called to join the meeting when the availability state indicated that the user is not available for the meeting based on the specified interaction data, sensor data or meeting data, or other information related to initiating a call to the user for joining the meeting.

In some embodiments, subsequent to the updating of the prediction model, the prediction model may be used to determine an availability state of the user and initiate a call to the user based on the availability state for joining the meeting. As an example, information related to interaction data, sensor data or meeting data may be obtained and provided to the prediction model to obtain one or more predictions from the prediction model. The predictions obtained from the prediction model may be used to determine whether the user is available for joining a meeting and initiating a call to the user accordingly for joining the meeting, determine whether to initiate a call for a first meeting or a second meeting if the meetings have conflicting meeting times, determine a phone number or client device on which the call to the user should be initiated, or generate other determinations. As an example, the predictions may include a prediction specifying that the availability state of the user indicates that the user is available and therefore, a call to join the meeting should be initiated to the user, a prediction specifying that a call should be initiated for a first meeting instead of a second meeting that has a conflicting meeting time with the first meeting, a prediction specifying a phone number or client device on which the call to the user should be initiated, or other prediction.

Example Flowcharts

Figure 4:
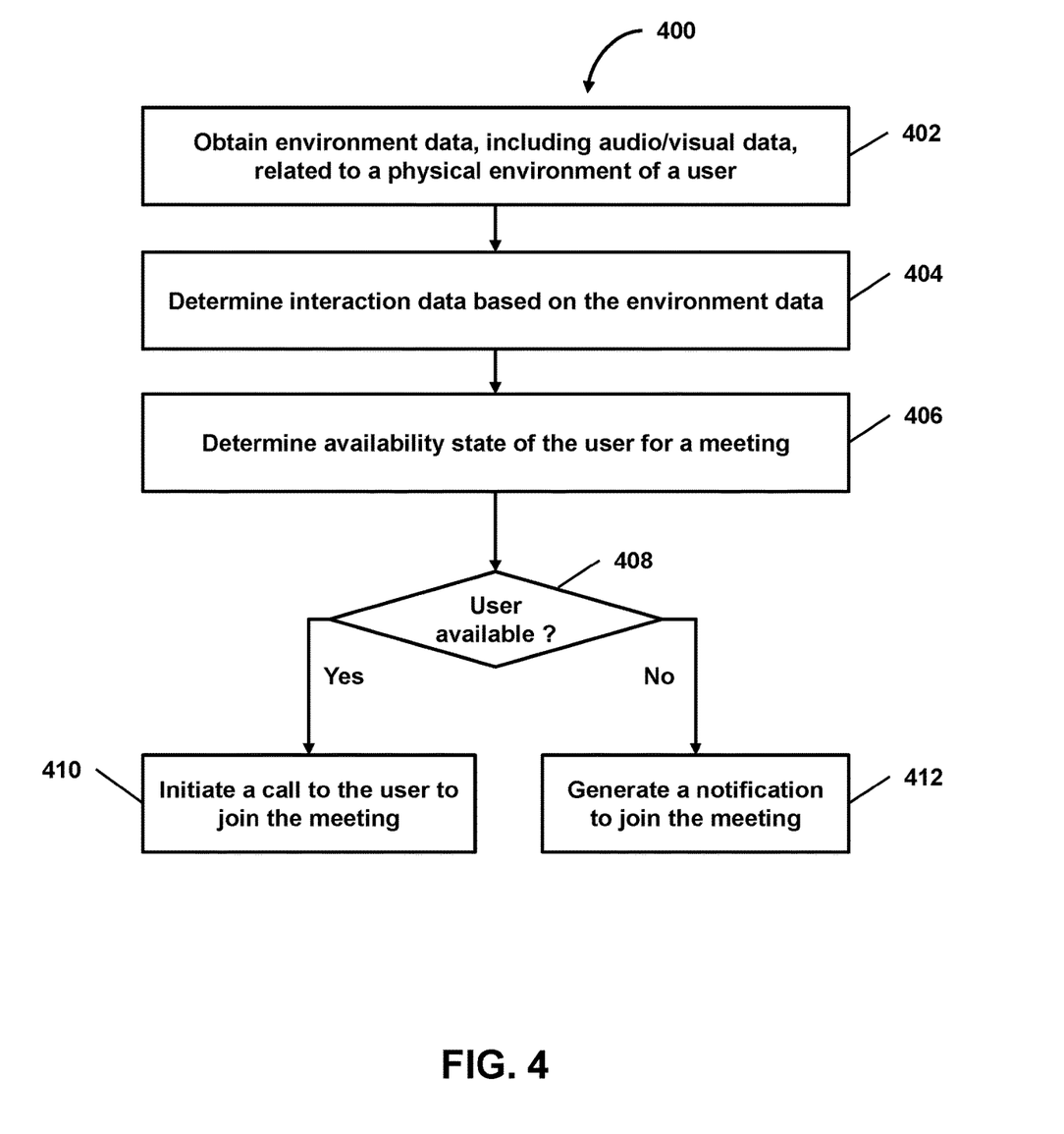
FIG. 4 shows a flowchart of a method of facilitating automated communication initiation to a user for joining a meeting, in accordance with one or more embodiments
Figure 5:
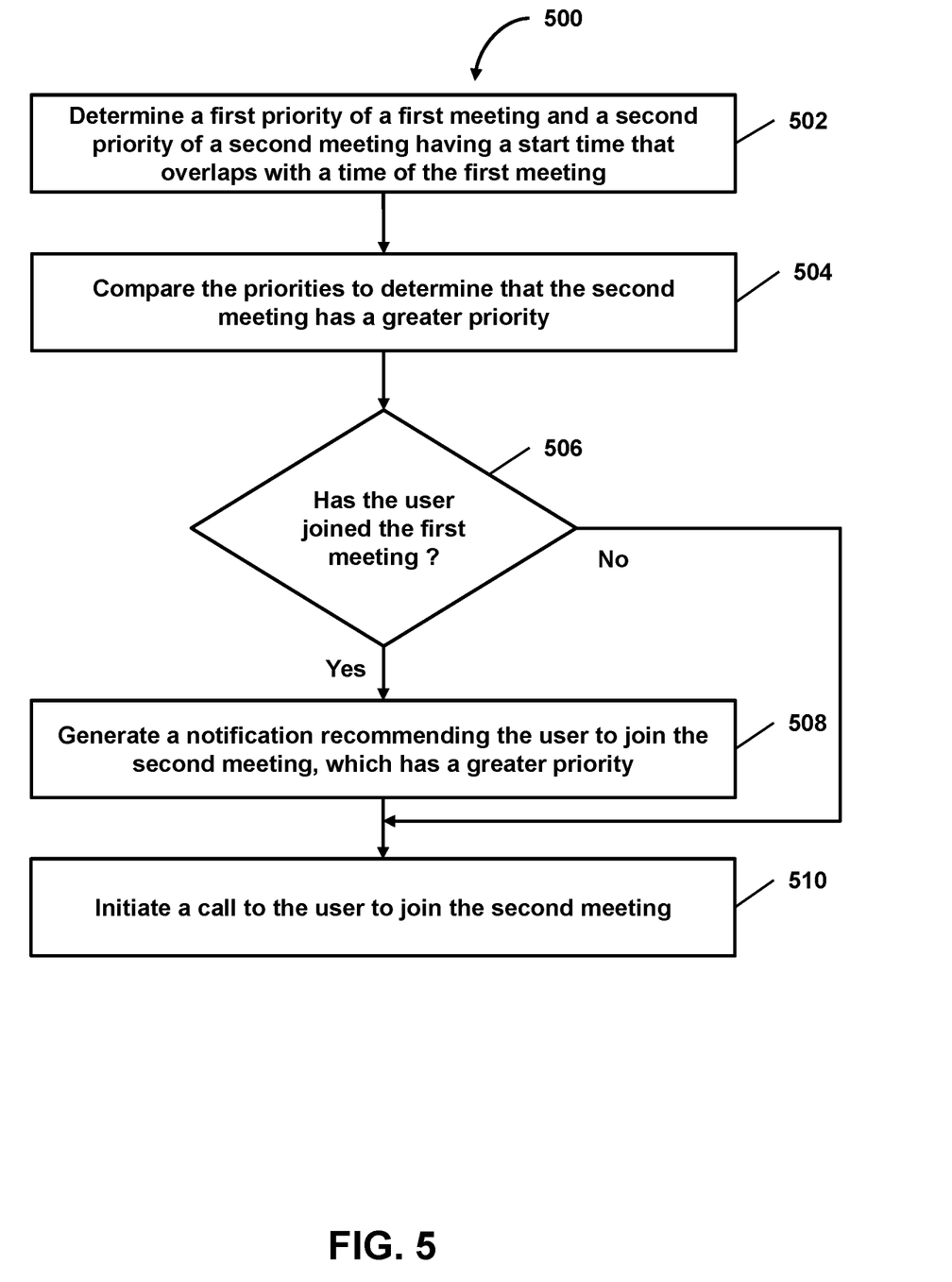
FIG. 5 shows a flowchart of a method of facilitating the user to join a meeting having a greater priority, in accordance with one or more embodiments.
Figure 6:
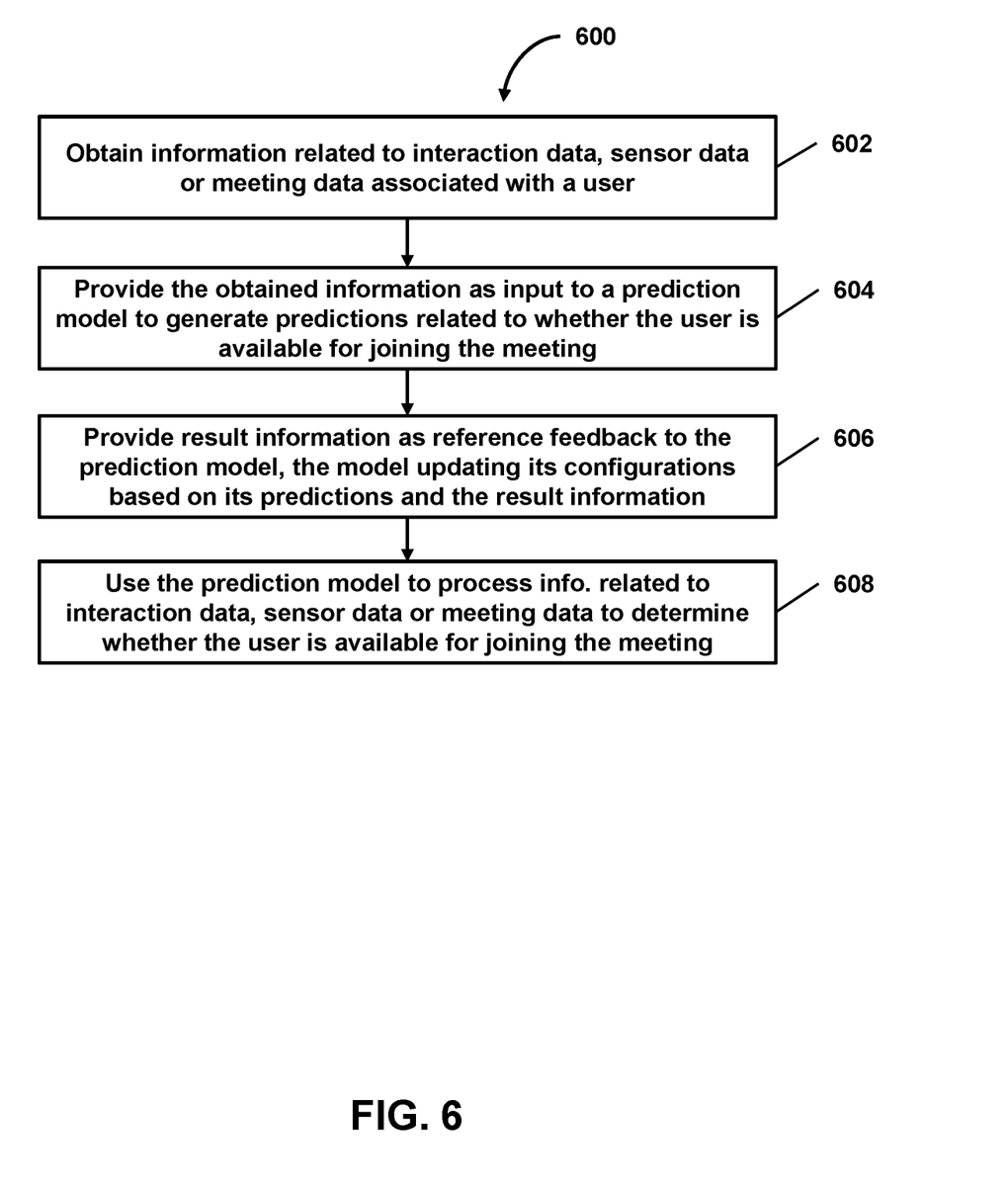
FIG. 6 shows a flowchart of a method of facilitating automatic communication initiation via a prediction model, in accordance with one or more embodiments.

FIGS. 4-6 are example flowcharts of processing operations of methods that enable the various features and functionality of the system as described in detail above. The processing operations of each method presented below are intended to be illustrative and non-limiting. In some embodiments, for example, the methods may be accomplished with one or more additional operations not described, and/or without one or more of the operations discussed. Additionally, the order in which the processing operations of the methods are illustrated (and described below) is not intended to be limiting.

In some embodiments, the methods may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

FIG. 4 shows a flowchart of a method 400 of facilitating automated communication initiation to a user for joining a meeting, in accordance with one or more embodiments. In an operation 402, environment data having data related to a physical environment of the user may be obtained (e.g., via a camera, a microphone or other sensors of a client device associated with the user). As an example, the environment data may include audio/visual data related to the physical environment of the user, sensor data such as a location of the user or a rate of motion of the user. Operation 402 may be performed by a subsystem that is the same as or similar to environment data subsystem 114, in accordance with one or more embodiments.

In an operation 404, interaction data indicating an extent of interaction of the user with one or more entities is determined based on the environment data. As an example, based on the audio/visual data received in operation 402, interaction data such as the user is interacting or conversing with another individual either in person or on a call, the user is listening to music, or the user is watching a video/movie may be determined. Operation 404 may be performed by a subsystem that is the same as or similar to interaction data subsystem 116, in accordance with one or more embodiments.

In an operation 406, an availability state of the user for joining the meeting may be obtained based on the interaction data. As an example, the availability state of the user may be determined as the user being unavailable based on the interaction data indicating that user is interacting with, conversing with, or physically present with another individual. As another example, the availability state of the user may be determined as being available for the meeting based on the interaction data indicating that user is not interacting with, conversing with, or physically present with another individual. Operation 406 may be performed by a subsystem that is the same as or similar to availability state subsystem 118, in accordance with one or more embodiments.

In an operation 408, a determination of whether the user is available for joining the meeting is made. If the availability state indicates that the user is available for the meeting, in operation 410 a call is initiated to the user for joining the meeting. As an example, if the user is determined to be available for joining the meeting, a call is initiated to a mobile phone of the user and accepting the call would join the user to the meeting. If the availability state indicates that the user is unavailable for the meeting, in operation 412 a notification is generated and sent to the user reminding the user to join the meeting. As an example, if the user is determined to be unavailable for joining the meeting, a notification is generated on the mobile phone of the user (e.g., via an app installed on the mobile device for facilitating automatic initiation of calls) or sent to the user (e.g., via email or text) reminding the user to join the meeting. The notification may also have a phone number for the user to dial-in to join the meeting. In some embodiments, the phone number in the notification is a one touch dial-in number, which automatically joins the user to meeting upon selecting/tapping the number without having the user to enter other information such as a meeting identification (ID) or participant ID. Operations 408-412 may be performed by a subsystem that is the same as or similar to call-out subsystem 120, in accordance with one or more embodiments.

In some embodiments, at least a portion of the method 400 may be performed at a time proximate a meeting time of the meeting. As an example, if the meeting is scheduled to start at a specified time, the method 400 may determine the availability state of the user from a specified period before the specified time (e.g., from 2 minutes or 5 minutes prior to the specified time) and then initiate a call to the user at the specified time based on the availability state of the user.

FIG. 5 shows a flowchart of a method 500 of facilitating the user to join a meeting having a greater priority, in accordance with one or more embodiments. In an operation 502, a first priority of a first meeting and a second priority of a second meeting that have conflicting meeting times (e.g., start time of one meeting overlaps with a meeting time of the other meeting). The priority associated with a meeting may be determined using a specified scale (e.g., a scale of 1-10, a scale of 1-5 or as an enumerated category—"low," "medium," and "high"). In some embodiments, the priority of a meeting may be determined from meeting data associated with the meeting, such as a list of participants in a meeting invite of the meeting, a subject of the meeting, body of the meeting invite, or a user-provided priority indicator in the meeting invite. As an example, the second meeting is determined to have a priority of "high" and the first meeting to have the priority of "medium." Operation 502 may be performed by a subsystem that is the same as or similar to availability state subsystem 118, in accordance with one or more embodiments.

In an operation 504, the priorities of the first and second meetings are compared to determine a meeting that is a greater priority. As an example, the second meeting having a priority of "high" is determined to have a greater priority than the first meeting, which has the priority of "medium." Operation 504 may be performed by a subsystem that is the same as or similar to availability state subsystem 118, in accordance with one or more embodiments.

In an operation 506, a determination is made as to whether the user has joined the first meeting. Operation 506 may be performed by a subsystem that is the same as or similar to call-out subsystem 120, in accordance with one or more embodiments.

If the user has joined the first meeting, in an operation 508, a notification is generated recommending the user to join the second meeting as the second meeting is determined to be of a greater priority than the first meeting. The notification may also have a phone number for the user to dial-in to join the meeting. If the user accepts the recommendation, in an operation 510, a call is initiated to the user for joining the second meeting. As an example, the user may disconnect the call to the first meeting before accepting the recommendation for the second meeting, or the call to the first meeting may be automatically disconnected upon the user accepting the recommendation.

In the operation 506, if a determination is made that the user has not joined the first meeting, in the operation 510, a call is initiated to the user for joining the second meeting. Operations 508 and 510 may be performed by a subsystem that is the same as or similar to call-out subsystem 120, in accordance with one or more embodiments.

FIG. 6 shows a flowchart of a method 600 of facilitating automatic communication initiation via a prediction model, in accordance with one or more embodiments. In an operation 602, information related to interaction data, sensor data or meeting data associated with a user may be obtained. Operation 602 may be performed by a subsystem that is the same as or similar to model subsystem 122, in accordance with one or more embodiments.

In an operation 604, the interaction data, sensor data or meeting data may be provided as input to a prediction model to generate predictions. As an example, the predictions may be related to whether the user is available for joining a meeting, whether to initiate a call for a first meeting or a second meeting if the meetings have conflicting meeting times, and to which phone number or client device the call to the user should be initiated. Operation 604 may be performed by a subsystem that is the same as or similar to model subsystem 122, in accordance with one or more embodiments.

In an operation 606, result information may be provided as reference feedback to the prediction model. As an example, the result information may be related to call acceptance/rejection information indicating (a) whether the user accepted the automatically initiated call or not when the availability state indicated that the user is available for the meeting based on a specified interaction data, sensor data or meeting data, or (b) whether the user manually called to join the meeting when the availability state indicated that the user is not available for the meeting based on the specified interaction data, sensor data or meeting data, or other information related to initiating a call to the user for joining the meeting. Operation 606 may be performed by a subsystem that is the same as or similar to feedback subsystem 124, in accordance with one or more embodiments.

In an operation 608, subsequent to the updating of the prediction model, the prediction model may be used to determine an availability state of the user and initiate a call to the user based on the availability state for joining the meeting. As an example, information related to interaction data, sensor data or meeting data may be obtained and provided to the prediction model to obtain one or more predictions from the prediction model. The predictions obtained from the prediction model may be used to determine whether the user is available for joining a meeting and initiating a call to the user accordingly for joining the meeting, determine whether to initiate a call for a first meeting or a second meeting if the meetings have conflicting meeting times, determine a phone number or client device on which the call to the user should be initiated, or generate other determinations. Operation 608 may be performed by a subsystem that is the same as or similar to availability state subsystem 118, in accordance with one or more embodiments.

In some embodiments, the various computers and subsystems illustrated in FIG. 1 may include one or more computing devices that are programmed to perform the functions described herein. The computing devices may include one or more electronic storages (e.g., prediction database(s) 132, which may include training data database(s) 134, model database(s) 136, etc., or other electronic storages), one or more physical processors programmed with one or more computer program instructions, and/or other components. The computing devices may include communication lines or ports to enable the exchange of information within a network (e.g., network 150) or other computing platforms via wired or wireless techniques (e.g., Ethernet, fiber optics, coaxial cable, WiFi, Bluetooth, near field communication, or other technologies). The computing devices may include a plurality of hardware, software, and/or firmware components operating together. For example, the computing devices may be implemented by a cloud of computing platforms operating together as the computing devices.

The electronic storages may include non-transitory storage media that electronically stores information. The storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 112-124 or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 112-124 described herein is for illustrative purposes, and is not intended to be limiting, as any of subsystems 112-124 may provide more or less functionality than is described. For example, one or more of subsystems 112-124 may be eliminated, and some or all of its functionality may be provided by other ones of subsystems 112-124. As another example, additional subsystems may be programmed to perform some or all of the functionality attributed herein to one of subsystems 112-124.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment may be combined with one or more features of any other embodiment.

The present techniques will be better understood with reference to the following enumerated embodiments:

1. A method comprising: obtaining audio/visual data related to a physical environment of a user from a client device associated with the user; determining, based on the obtained information, an availability state of the user for joining a meeting; and initiating a call to the user based on the availability state of the user indicating the user as being available for the meeting.
2. The method of embodiment 1, further comprising: obtaining sensor data from the client device indicating (a) a location of the user or (b) a rate of motion of the user; and determining the availability state of the user based on the sensor data.
3. The method of any of embodiments 1-2, further comprising: determining the availability state as being available for another meeting with a greater priority than the meeting; and initiating the call related to the other meeting to the user.
4. The method of any of embodiments 1-3, wherein determining the availability state includes determining an extent of interaction of the user with one or more individuals based on the audio/visual data.
5. The method of any of embodiments 1-4, wherein the audio/visual data indicates a presence of another individual in the physical environment of the user.
6. The method of any of embodiments 1-5, wherein the audio/visual data indicates a presence of a voice of the user or another individual in the physical environment of the user.
7. The method of any of embodiments 1-6, wherein determining the availability state includes determining the availability state as the user being available for the meeting based on the audio/visual data indicating that the one or more other individuals are (a) not in conversation with the user and (b) not present with the user.
8. The method of any of embodiments 1-7, wherein determining the availability state includes determining the availability state as the user being unavailable for the meeting based on the audio/visual data indicating that the one or more other individuals are (a) in conversation with the user or (b) present with the user.

9. The method of any of embodiments 1-8, wherein determining the availability state includes: determining the availability state as the user being unavailable for the meeting based on the audio/visual data indicating that a noise level in the physical environment exceeds a threshold.

10. The method of any of embodiments 1-9, wherein determining the availability state includes: determining the availability state as the user being unavailable for the meeting based on the sensor data indicating that a rate of motion of the user exceeds a threshold.

11. The method of any of embodiments 1-10, further comprising: providing training information as input to a prediction model to generate predictions, the training information relating to the audio/visual data, the sensor data, the meeting data, the availability state data and call acceptance/rejection data indicating whether the user accepted or rejected the call.

12. The method of embodiment 11, wherein the predictions are related to whether the user is available for joining a meeting, whether to initiate a call for a first meeting or a second meeting if the meetings have conflicting meeting times, which phone number or client device the call to the user should be initiated on.

13. The method of any of embodiments 11-12, further comprising: providing result information as reference feedback to the prediction model, the prediction model updating one or more portions of the prediction model based on the result information.

14. The method of embodiment 13, wherein the prediction model is configured to assess the predictions against the result information and update the one or more portions of the prediction model based on its assessment of the predictions.

15. The method of any of embodiments 13-14, wherein the result information is related to call acceptance/rejection information indicating whether the user accepted the automatically initiated call or not when the availability state indicated that the user is available for the meeting based on a specified interaction data, sensor data or meeting data.

16. The method of any of embodiments 13-15, wherein the result information indicates whether the user manually called to join the meeting when the availability state indicated that the user is not available for the meeting based on the specified interaction data, sensor data or meeting data.

17. The method of any of embodiments 13-16, further comprising: subsequent to the updating of the prediction model, providing the obtained information as input to the prediction model to determine an availability state of the user and initiate a call to the user based on the availability state for joining the meeting, determine whether to initiate a call for a first meeting or a second meeting if the meetings have conflicting meeting times, determine a phone number or client device the call to the user should be initiated on.

18. The method of any of embodiments 13-17, wherein the prediction model comprises a neural network or other machine learning model.

19. The method of any of embodiments 1-18, wherein the client device comprises a mobile device.

20. A tangible, non-transitory, machine-readable medium storing instructions that, when executed by a data processing apparatus, cause the data processing apparatus to perform operations comprising those of any of embodiments 1-19.

21. A system comprising: one or more processors; and memory storing instructions that, when executed by the processors, cause the processors to effectuate operations comprising those of any of embodiments 1-19.

What is claimed is:

1. A system for facilitating automated call initiation via environment-related user availability determination, the system comprising:
a computer system comprising one or more processors programmed with computer program instructions that, when executed, cause the computer system to:
responsive to a current time being proximate a meeting time of a meeting, obtain audio and visual data related to a physical environment of a user scheduled as a participant of the meeting;
perform image recognition and natural language processing on the audio and visual data to derive interaction data associated with the user, the interaction data indicating an extent to which one or more other individuals are present with the user and interacting with the user;
determine an availability state of the user for the meeting based on the interaction data; and
initiate a call to the user based on the availability state indicating that the user is available for the meeting, wherein the user is automatically joined to the meeting upon the user accepting the call.

2. The system of claim 1, wherein the computer system is further caused to:
obtain sensor data related to the physical environment of the user from a computing device associated with the user, the sensor data indicating an extent to which the user is in motion; and
determine the availability state of the user based on the extent to which the user is in motion.

3. The system of claim 1, wherein the computer system is caused to:
determine the availability state of the user as being available for the meeting based on the interaction data indicating that the user is not interacting with the one or more other individuals.

4. A method comprising:
obtaining, by one or more processors, environment data related to a physical environment of a user associated with a meeting, the environment data comprising audio and visual data related to the physical environment of the user;
performing, by the one or more processors, image recognition and natural language processing on the environment data to derive interaction data associated with the user, the interaction data indicating an extent to which one or more other individuals are physically present and interacting in the physical environment with the user;
determining, by the one or more processors, an availability state of the user for the meeting based on the interaction data; and
initiating, by the one or more processors, a call related to the meeting to the user based on the availability state indicating that the user is available for the meeting.

5. The method of claim 4, wherein obtaining the environment data includes obtaining the audio and visual data from a computing device associated with the user.

6. The method of claim 4, wherein determining the interaction data includes:
detecting, based on the image recognition from the audio and visual data, a presence of another individual in the physical environment of the user; and
determining the interaction data as indicating that the user is interacting with the other individual.

7. The method of claim 4, wherein determining the interaction data includes:

detecting, based on the audio and visual data, a presence of a voice of the user or another individual in the physical environment of the user; and determining, based on the voice, the interaction data as indicating that the user is interacting with the other individual.

8. The method of claim 4, wherein determining the availability state of the user for the meeting includes:

determining whether the interaction data satisfies a specified criterion, and responsive to the interaction data satisfying the specified criterion, determining the availability state of the user as being available for the meeting.

9. The method of claim 4, wherein determining the availability state includes:

determining the availability state of the user as being available for the meeting based on the interaction data indicating that the one or more other individuals are not in conversation with the user.

10. The method of claim 4, wherein obtaining the environment data further includes obtaining sensor data from a computing device associated with the user, the sensor data indicating (a) a location of the user or (b) a rate of motion of the user.

11. The method of claim 4, wherein determining the availability state includes:

determining the availability state of the user as not being available for the meeting based on sensor data indicating that a rate of motion of the user exceeds a threshold.

12. The method of claim 4, wherein determining the availability state includes:

determining the availability state of the user as not being available for the meeting based on the audio and visual data indicating that a noise level in the physical environment exceeds a threshold.

13. The method of claim 4 further comprising:

determining a first priority associated with the meeting and a second priority of another meeting in which the user is scheduled to participate, the other meeting having a start time that overlaps with a time of the meeting, and initiating the call related to the other meeting to the user based on the second priority being greater than the first priority.

14. The method of claim 13, wherein determining the first priority associated with the meeting includes:

determining the first priority based on meeting data associated with the meeting, the meeting data indicating participants listed in a meeting invite of the meeting, a subject of the meeting, or a priority indicator in the meeting invite.

15. The method of claim 13, wherein initiating the call related to the other meeting includes:

generating a notification on a computing device associated with the user, the notification recommending the user to join the other meeting which has a higher priority than the meeting.

16. The method of claim 15, further comprising:

initiating the call to the user to join the other meeting responsive to an indication that the user accepted the recommendation to join the other meeting.

17. A non-transitory computer-readable medium storing instructions that, when executed by one or more processors, cause operations comprising:

obtaining, from a computing device of a user associated with a meeting, environment data related to a physical environment of the user, the environment data including audio and visual data related to the physical environment of the user;

performing image recognition and natural language processing on the environment data to derive interaction data associated with the user, the interaction data indicating an extent of user engagement with one or more other individuals or one or more individuals present with the user;

determining an availability state of the user for the meeting based on the interaction data; and initiating a call related to the meeting to the user based on the availability state indicating that the user is available for the meeting.

18. The non-transitory computer-readable medium of claim 17, wherein determining the availability state includes:

determining the availability state as the user being available for the meeting based on the interaction data indicating that the one or more other individuals are not in conversation with the user.

19. The non-transitory computer-readable medium of claim 17, wherein determining the availability state of the user further includes:

obtaining sensor data from the computing device, the sensor data indicating a rate of motion of the user or the user is in motion, and determining the availability state of the user as not being available based on the sensor data indicating the rate of motion exceeds a threshold.

20. The non-transitory computer-readable medium of claim 17, wherein determining the availability state includes:

determining the availability state of the user as being available based on the interaction data indicating that a noise level in the physical environment does not exceed a threshold.

* * * * *